United States Patent [19]

Macina

[11] 4,316,282

[45] Feb. 16, 1982

[54] MULTICHANNEL FREQUENCY TRANSLATION OF SAMPLED WAVEFORMS BY DECIMATION AND INTERPOLATION

[75] Inventor: Nicola A. Macina, Chatham, N.J.

[73] Assignee: RCA Corporation, New York, N.Y.

[21] Appl. No.: 96,743

[22] Filed: Nov. 23, 1979

[51] Int. Cl.³ .............................................. H04J 1/05
[52] U.S. Cl. ...................................... 370/70; 370/50; 370/112
[58] Field of Search ........................... 370/70, 50, 112

[56] References Cited

U.S. PATENT DOCUMENTS 3,808,412  4/1974  Smith .................................... 370/70
3,875,340  4/1975  Roy ...................................... 370/70
4,117,541  9/1978  Ali ....................................... 370/70

OTHER PUBLICATIONS

*IEEE Transactions on Communication Technology;* vol. Com-19, No. 1; Feb. 1971; "SSB/FOM Utilizing TOM Digital Filter" by Kurth.
*Proceedings, IEEE;* vol. 123, No. 12, Dec. 1976; "Techniques For The Digital Interfacing of TOM/FOM Systems", by Tomlinson et al.

*Primary Examiner*—David L. Stewart
*Attorney, Agent, or Firm*—Samuel Cohen; Robert L. Troike; Donald W. Phillion

[57] ABSTRACT

A system and method for frequency division demultiplexing a received broad band signal into $k^m$ channels, each capable of containing a baseband signal component and comprising m descending tiers of identical channel division modules with the first tier thereof comprising a first module responsive to the received broad band signal to divide such broad band signal (at baseband) into k new channels each containing a baseband spectral component. Each module of each tier of modules is constructed to respond individually (by sampling and de-sampling techniques) to the spectral component in individual ones of the channels outputted from the immediately preceding higher order tier of modules to form k new additional channels each containing a baseband spectral component. Each baseband spectral component has an upper bandwidth limit which bears the same ratio to its sampling rate as the upper bandwidth limit of the originally received broad band signal bears to its sampling rate.

6 Claims, 19 Drawing Figures

MULTICHANNEL FREQUENCY TRANSLATION OF SAMPLED WAVEFORMS BY DECIMATION AND INTERPOLATION

This invention relates generally to method and and means for demultiplexing by frequency division the channels contained in a received broad band signal and more particularly by demultiplexing such broad band signal structure having improved energy and cost efficiency.

Channelized receiver systems are needed to cope with the wide bandwidth and high data rates of the various spread-band communication systems currently in use. Conventional approaches to the design of channelized receivers employ fixed frequency analog filters, mixers, and local oscillators. Filter characteristics, oscillator drift, and other problems limit the resolution and performance of such receivers. Furthermore, such receivers require extensive hardware, including at least one oscillator and one mixer for each channel, making the structure costly and too large for some applications.

The aforementioned difficulties are limited in systems designed in accordance with this invention because, inter alia, the mixers and local oscillators are eliminated. When configured with charge coupled device (CCD) arrays the resulting system is compact and economical in terms of both components and energy.

In accordance with a preferred embodiment of the invention there is provided descending tiers of identical frequency channel division modules with the first tier thereof comprising a first module responsive to a received broad band signal and to sampling and desampling signals to divide such broad band signal into k new channels each containing a baseband frequency spectral component. Each module of each successive tier of modules responds individually to the spectral component of individual ones of the channels supplied from the immediately preceding higher order tier of modules and to sampling and de-sampling signal to form k new additional channels each containing a baseband spectral component whose bandwidth bears the same ratio to its sampling rate as the bandwidth of the originally received broad band signal bears to its sampling rate.

Before discussing the processing steps to which the signal is subjected in order to separate the channels which make up the received signal, and the structure required to perform such processing steps, a general discussion of the invention and its purpose will be set forth in order to provide a better background for an understanding of the detailed processing steps and of the aforementioned structure for performing such steps. Also the concepts of de-sampling and interpolation will be defined.

De-sampling is defined herein as meaning the removal, by appropriate gating means, of a certain number of the sampling signals generated by a sampling frequency such as sampling frequency $f_s$. For example, de-sampling by $f_s/5$ removes four of every five samples of a train of sampled pulses produced by a sampling signal of frequency $f_s$. By de-sampling at the proper ratio the bandwidth for successive tiers of spectral components will always retain the same ratio to the sampling frequency as the bandwidth of the originally received signal bears to its sampling rate.

The term "interpolation," as employed herein, means the changing of the sampled rate of a signal in a given channel from a first sampled rate, undesired but necessary because of the position of the frequency spectrum of the given channel with respect to the sampling frequency, to a different but desired sampled rate which will permit the translation of said frequency spectrum to baseband by the same sampling frequency employed to translate to baseband the spectrums of the other channels of the same tier. The concepts of de-sampling and interpolation will become clearer from a reading of the specification.

Broadly speaking, it is desired to receive a broad band signal containing a plurality of channels of information. Assume for purposes of discussion that the received broad band signal contains 125 separate channels of information. The received signal is first divided into a first tier of five channels each of which contains 25 of the 125 received channels.

The signal contained in a channel of any tier of channels is defined herein as a spectral component. A first tier of logic, which consists of a single module comprising, inter alia, a timing means for producing a sampling signal of frequency $f_s$, other sampling and de-sampling signals, and appropriate bandpass filters, functions to separate the received signal into the first tier of 5 channels mentioned above. Each module, all of which can be identical, can be formed on a single integrated circuit chip.

Each of the 5 channels is then supplied to another module of a second tier of 5 modules. Each module of the second tier of modules is identical to the first single module and divides said each channel into 5 additional channels of information (each channel containing a spectral component) with each of said additional channels of information comprising 5 of the originally received 125 channels. Thus, 5 additional modules are required to separate the 5 first tier channels of information into a total of 25 second tier channels of information each comprising 5 of the 125 originally received channels.

Each of the second tier channels of information is then in turn supplied to a module, identical to the previously mentioned modules, which in turn divides each of the second tier channels into 5 third tier channels of information (each channel again containing a spectral component), with each third tier channel comprising one of the 125 originally received channels of information. Thus, the third tier of channels requires 25 modules in order to separately output the 125 channels of information.

Accordingly, the total number of modules in the first, second and third tiers required to separately output the 125 originally received channels, is 31 modules.

In order that the identical module can be used in all 3 tiers of frequency spectrum the signals, including the spectral component and the timing signals, supplied to each of the modules must all have the same time and frequency relationships. In other words, if the originally received broad band signal covers a bandwidth of $f_s/2$, including bandwidth guards at either end of the bandwidth containing the 5 channels, then the received signal can be sampled at a rate $f_s$ in accordance with Nyquist's Theorem. The frequency spectrum being sampled is at baseband, and bears a given relationship to the sampling rate $f_s$. Specifically, the sampling rate is twice the frequency spectrum of the broad band signal to be sampled, which has a positive frequency characteristic, and is, as mentioned above, at baseband.

Thus, each of the second and third tier spectral components must be a positive frequency, must be located at baseband, and must bear a relationship to the sampling rate wherein the spectral component bandwidth is one-half the sampling rate for that particular tier of spectral components. For example, assume that the originally received signal has a bandwidth of 125 MH$_z$. Therefore the sampling rate must be 250 MH$_z$ for the first tier of sampling. Then, since the received signal is sub-divided into 5 sub-channels which form the second tier of channels, each channel in said second tier of channels will have a bandwidth of 25 MH$_z$, so that the sampling rate for the second tier will be 50 MH$_z$. The third tier of modules will divide the frequency spectrum of each second tier channel again by five to produce 125 channels, each having a five MH$_z$ bandwidth and a sampling rate of 10 MH$_z$.

Figure 1:
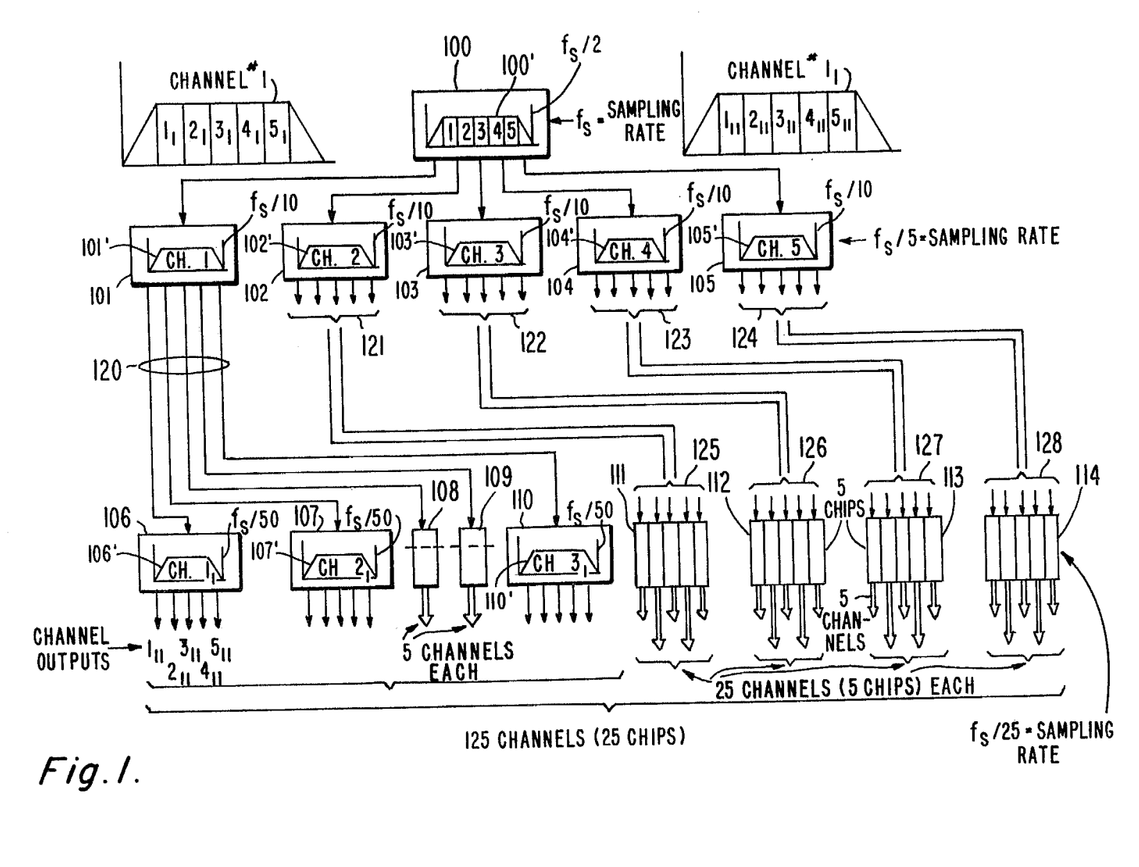
FIG. 1 is a broad functional block diagram of the invention.

In FIG. 1 there are shown 3 tiers of modules which output 3 tiers of channels each containing a spectral component. The first tier of modules consists of a single module 100 which responds to the received broad band signal to divide it into the 5 channels indicated in the waveform 100'. The module 100 contains the logic shown in FIG. 3 which will be described in more detail later and which functions generally to divide a received spectral component into 5 equal bandwidth spectral components. The second tier of modules 101, 102, 103, 104, and 105 are identical to the module 100 and each also contains the logic shown in FIG. 3. Each of the modules 101-105 functions to receive one of the 5 channels outputted by module 100. The waveforms (spectral components) of such received channels are identified by reference characters 101', 102', 103', 104', and 105'. It will be noted that the bandwidth of each of these signals 101'-105' is one fifth the bandwidth of the received broad band spectrum signal 100' and that the sampling rate of the spectrum components of the second tier will be $f_s/5$. The sampling rate $f_s/5$ is twice the bandwidth $f_s/10$ of each of the waveforms 101'-105'.

Each of the third tier of modules, such as modules 106, 107, 108, 109, and 110, functions to separately receive one each of the channel spectral components outputted from the second tier modules and to divide each one thereof into 5 additional channels, each containing a spectral component having one-fifth the bandwidth of the received component. Thus, module 106, for example, receives channel 1$_1$ from the second tier module 101, divides it into 5 new channels, 1$_{11}$ through 5$_{11}$. The subscript 11 indicates that the channel is derived from the first channel of the first tier of channels and the first channel of the second tier of channels.

It will be noted that in FIG. 1 the waveforms processed by any given module are identified by the same reference character as the module, except that it is primed. Thus, for example, the waveform being processed by module 106 is designated by reference character 106'.

The modules 108 and 109 are exactly the same as the other modules of FIG. 1 but shown in smaller form to conserve space. Similarly, the four groups of modules 125, 126, 127, and 128 each contain 5 modules, all of which are the same as the other modules shown in FIG. 1, as stated above. Thus, the total number of channels outputted from the third tier of modules is 125 and requires 25 module chips. For the entire system shown in FIG. 1, 31 module chips are employed to divide the originally received broad band signal into 125 separate channels.

As is well known in sampling theory, sampling can be viewed as multiplication in the time domain of the signal to be sampled, f(t), by pulse train signal of unit amplitude, p(t). Letting f*(t) represent the sampled signal, the $$f^*(t) = f(t)p(t). \qquad \text{(Exp. 1)}$$

If T is the period of the sampling signal and $\tau$ is the width of each sampling pulse, then, by Fourier analysis, $$p(t) = \sum_{n=-\infty}^{\infty} C_n \exp(jn2\pi t/T) \qquad \text{(Exp. 2)}$$

where the coefficients $C_n$ are found from $$C_n = \frac{1}{T} \int_{-T/2}^{T/2} p(t) \exp(-jn2\pi t/T) dt \qquad \text{(Exp. 3)}$$

to be $$C_n = \frac{\tau}{T} \cdot \frac{\sin n\pi\tau/T}{n\pi\tau/T}. \qquad \text{(Exp. 4)}$$

Since $$f^*(t) = \sum_{n=-\infty}^{\infty} C_n f(t) \exp(jn2\pi t/T) \qquad \text{(Exp. 5)}$$

by substitution, then the frequency domain representation of the sampled signal f*(t) is found by transforming both sides of the equation to give $$F^*(f) = \sum_{n=-\infty}^{\infty} C_n F(F - nf_s) \qquad \text{(Exp. 6)}$$

where $f_s = 1/T$, the sampling frequency.

Therefore, the total frequency spectrum of a sampled signal it its initial frequency spectrum repeated at all integral values, both positive and negative, of the sampling frequency.

The spectrums will have an envelope of $(\tau/T)\sin n\pi\tau/T/(n\pi\tau/T)$ so that as n approaches infinity, the amplitude of the spectrum decreases to zero. For $\tau<<T$, the decrease of amplitude with increase of frequency is slow. As $\tau$ approaches zero, the sampling signal becomes $$p(t) = \sum_{n=-\infty}^{\infty} S(t-nT), \quad \text{(Exp. 7)}$$

i.e., periodically spaced impulse functions so that $$f^*(t) = f(t) \sum_{n=-\infty}^{\infty} S(t-nT). \quad \text{(Exp. 8)}$$

Since f(t) has significance only when t=nT, the $$f^*(t) = \sum_{n=-\infty}^{\infty} f(nT)S(t-nT) \quad \text{(Exp. a)}$$

and $$F^*(f) = \frac{1}{T} \sum_{n=-\infty}^{\infty} F(f-nf_s). \quad \text{(Exp. 10)}$$

As $\tau$ becomes narrower, the frequency spectrum components tend to die out more slowly as frequency increases and the envelope of each spectral component is affected less by the sin x/x shape. (It is assumed in this description that the frequency spectrum of f(t) if band-limited to values less than $f_s/2$.)

Figure 4:
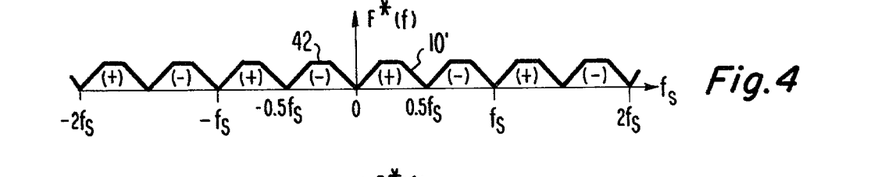
FIG. 4 is a wave shape showing the positive and negative images of the spectral component of FIG. 2A extended over a number of integral multiples of the sampling frequency.

If the waveform shown in FIG. 2A were extended over more than one integral multiple of the sampling frequency, it would appear (not to scale) as shown in FIG. 4. Spectral component 10' is the original signal 10, which includes the negative frequency component 42. Replicas of the frequency spectral components 10' and 42 therefore appear centered about each integral value of $\pm f_s$.

The frequency spectrum wave shape 10 shown in FIG. 2A contains 5 channels labeled #1–#5 and is band-limited for filtering. More specifically, the band-limiting is between 0 frequency at point 11 and point 12 ($f_s/2$) with $f_s/2$ being equal to one-half the sampling frequency $f_s$. Such band-limiting is required to eliminate the images of waveform 10 which could result in overlapping of the resulting image spectral components produced by the sampling of waveform 10 by sampling frequency $f_s$.

As discussed above, the main purpose of this invention is to separate and extract therefrom each of the 5 channels in the wave shape 10 and then in turn to divide and separate each of these 5 channels into 5 additional second-tiered channels and then to again divide each of the second tiered channels into 5 third-tiered channels. Since the separation of any given tier of channels into a subsequent tier of channels is the same it is only necessary to discuss the separation and extraction of the channels of a given tier of channels. Consider, for example, the separation and extraction of the 5 channels contained in the wave shape 10 of FIG. 2A, and more specifically, consider first the extraction of channel 1 therefrom.

Figure 2:
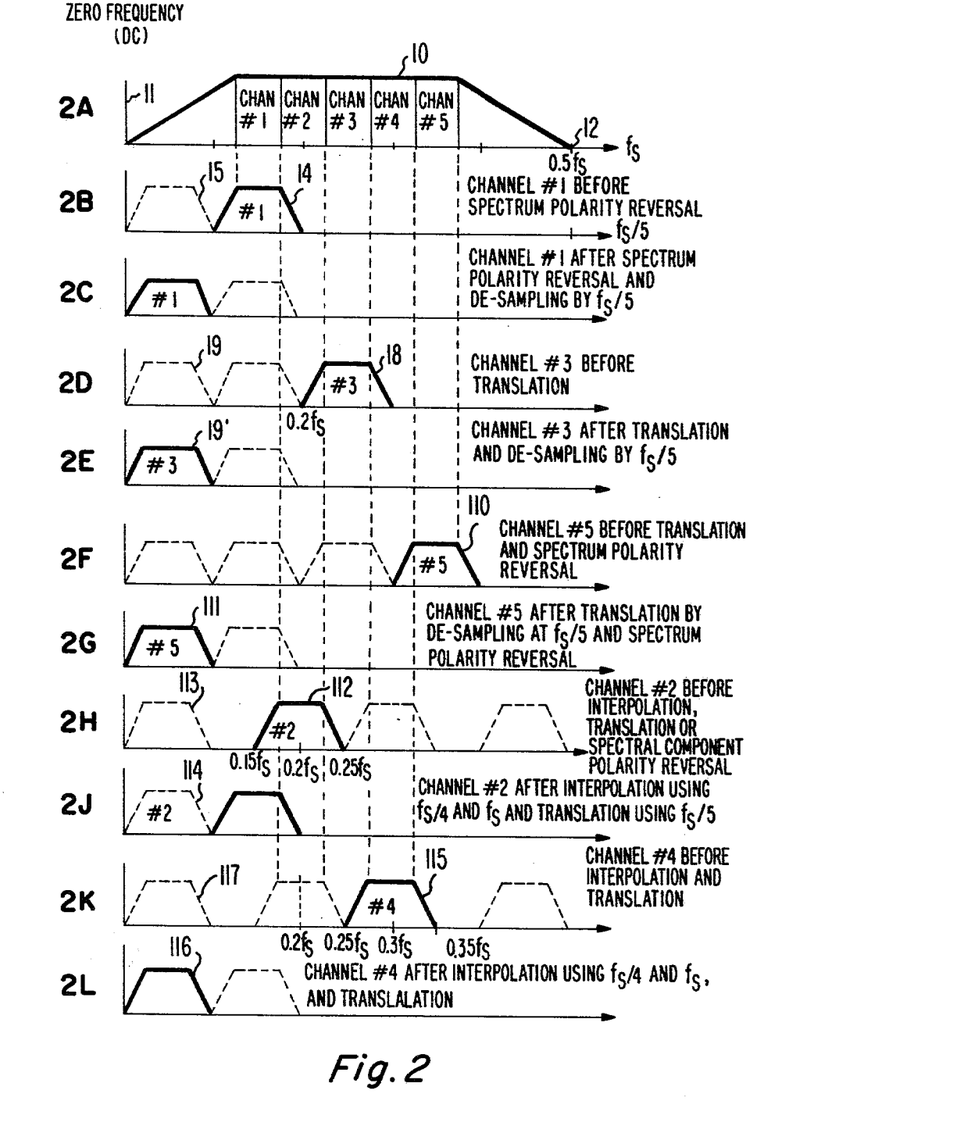
FIG. 2 including 2A-2L is a series of wave shapes showing the spectral components resulting from demultiplexing the received broad band signal into five equal bandwidth channels.
Figure 3:
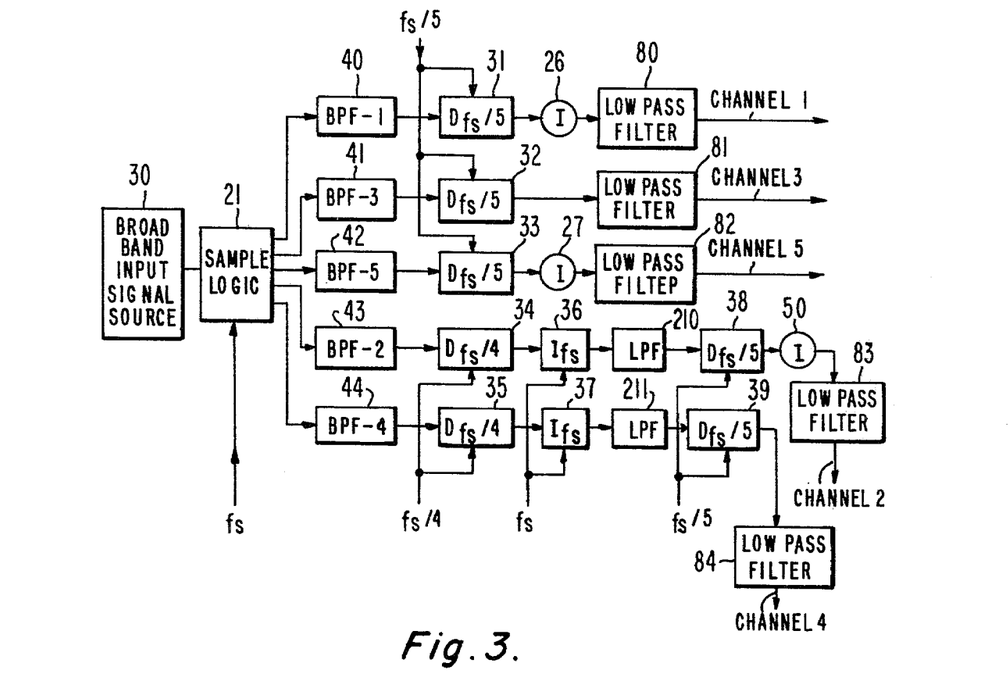
FIG. 3 is a block diagram of the modules employed to demultiplex a given spectral component by frequency division.
Figure 5:
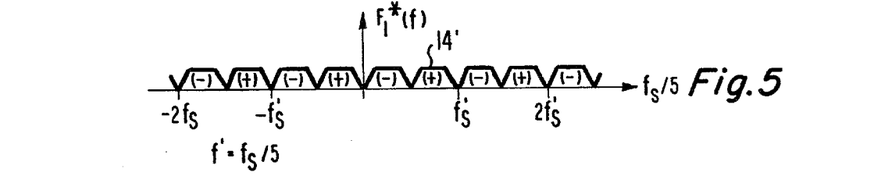
FIG. 5 is a wave shape showing the positive and negative images of the spectral component of a single channel of the wave shape of FIG. 2A extended over a number of integral multiples of the sampling frequency.

The signal represented by the wave shape 10 is first sampled at the $f_s$ rate, with the resulting signal samples being supplied to the bank of transversal type bandpass filters 40, 42, 44, 46, and 48, shown in FIG. 3, of which bandpass filter 40 is employed to separate the frequency spectrum contained in channel 1 of FIG. 2A. A bandpass filter of proper design is employed to filter the channel 1 frequency spectral component to produce the filtered wave shape 14 of FIG. 2B which has the same shape as the wave shape 10 of FIG. 2A. This wave shape 14, which is in the time domain, is then sampled at 1/5 the previous sampling rate, i.e., at $f_s/5$ or $0.2 f_s$. The sampling at $0.2 f_s = f'_s$ is shown in FIG. 5 where the original wave shape is shown as component 14' and is repeated in a positive and negative polarity about each integral value of $f'_s$. The wave shape 15 of FIG. 2B is a negative spectral component of the sampled and filtered signal of channel 1. This negative component 15, however, is at baseband. Therefore it is desirable to shift the waveform of FIG. 5 so that the component 15 of FIG. 2B is a positive component.

The positive and negative components of the sampled spectrum can be interchanged by inverting (multiplying by a -1) alternate (odd) sample value. This is equivalent to multiplying by cos $\pi$t. The basis for foregoing is as follows. To shift a spectral value in the frequency domain, i.e., $F(f-f_0)$, the time domain signal is multiplied by a complex number, viz., exp $(-jw_0t)$. That is, the inverse transform of $H(f-f_0)$ is f(t) exp $(-jw_0t)$. Since $$\exp(-jw_0t) = \cos w_0t - j \sin w_0t$$

For discrete signals, the above transform is given as $$F(n-i) = f(k) \exp(-j2\pi ki/N)$$

where

N = number of sample per cycle,
i = number of sample points to be shifted in the frequency domain,
k = k-th time domain sample.

To shift a half sample, i=N/2 and exp $(-j2\pi ki/N)$ = exp $(-j\pi k)$. Since sin k is zero for all integral values of k, $$\exp(-j\pi k) = \cos k\pi = \begin{cases} 1: k \text{ even} \\ -1: k \text{ odd} \end{cases}$$

Therefore, inverting alternate (odd) sample values shifts the frequency spectrum by half a cycle which, in effect, interchanges positive and negative frequency components.

After de-sampling channel 1 as shown in FIG. 2B and inverting the alternate sample values, the positive frequency component ends up as the spectral component 15 of FIG. 2B.

If channel 3 is filtered as shown by the frequency components 18 of FIG. 2D and de-sampled at $0.2 f_s$, a similar continuum of positive and negative frequency components will be generated similar to that shown in FIG. 5 for channel 1 except that the frequency component 18 has a positive image 19 at baseband. Therefore, channel 3 after sampling at $f_s$ and being bandpass filtered, need only be de-sampled at $0.2 f_s$ to produce a frequency spectral component 19' at baseband as shown in FIG. 2E.

Channel 5 is filtered as shown in FIG. 2F to produce a spectral component 110 which, when de-sampled at $0.2 f_s$, generates positive and negative frequency components as shown in FIG. 2F. Thereafter, each alternate $0.2 f_s$ sample value is inverted to produce a positive frequency spectrum 111 at baseband as shown in FIG. 2G.

So far is has been shown how the odd channels can be converted to baseband by sampling and de-sampling, and inverting alternate sample values of alternate channels.

As seen in FIG. 2H, the channel filtered spectral component 112 lies centered on the $f_s/5$ frequency. Therefore, de-sampling by a factor of 5 will not produce a full positive frequency spectrum component at baseband. Instead, only half the spectrum of channel 2 will appear.

In order to reduce channel 2 to baseband by de-sampling, the filtered signal for channel 2 is first de-sampled by $f_s/4$. This produces the images shown in dotted lines in FIG. 2H which have gaps between various spectral components. The signal as shown in FIG. 2H is then in effect sampled again at the sampling frequency $f_s$ and filtered to produce the baseband spectral component 114 shown in FIG. 2J which is a negative spectrum. The interpolative sampling of the signal of FIG. 2H functions to interpolate the frequency spectrum sampling rate back up to the sampling frequency $f_s$ with the spectral component 114 being at baseband. The signal of FIG. 2J is then de-sampled at the $f_s/5$ rate to produce a decimated spectrum which is then inverted to produce a positive frequency component at baseband, i.e., at the position previously occupied by negative spectral component 114.

In FIG. 2K, channel 4 has been filtered to produce component 115 which is de-sampled by $f_s/4$, again producing a frequency spectrum having gaps. The resultant signal is sampled again at $f_s$ and de-sampled at $f_s/5$. This produces a positive spectral component 116 at baseband, as shown in FIG. 2L. No inversion is required for channel 4, the frequency image component 116 being a positive frequency component. Interpolating and decimating are required for channels 2 and 4 to permit the cascading of modules. That is, if only channel 2 were desired the spectrum of the signal in FIG. 2H could be inverted to produce a positive component 113 which would have the sampling frequency of $f_s/4$. By interpolating and decimating the upper bandwidth limit of all the baseband signals is at $f_s/5$ so that another module can be used to separate 5 channels from each of the baseband spectral components of each channel into 5 additional baseband spectral components in the same manner just described.

Figure 3A:
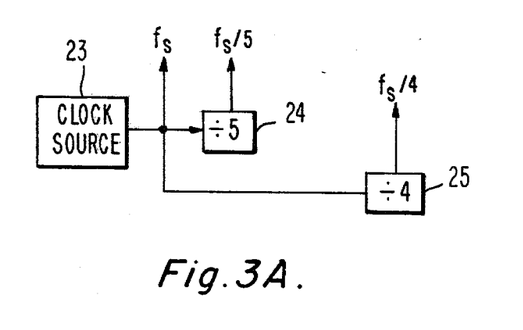
FIG. 3A is a block diagram of a clock pulse source and timing means employed in the logic of FIG. 3.

The logic for performing the above-described frequency decimation is shown in FIG. 3. The band-limited input signal 30 (from FIG. 2A) is applied to a sampling means 21. Alternatively, a sampling means could be used for each channel but for the description herein only one sampling gate for all of the channels is shown. The sampled signals from sampling means 21 are supplied to the bandpass filters 40–44 which are separately tuned to one each of the various channels 1–5. For example, bandpass filter 40 passes the frequency band shown in FIG. 2B as frequency component 14. Similarly, bandpass filters 41 and 42 filter the signals for channels 3 and 5, respectively. Sampling signals are provided by clock 23 of FIG. 3A which is divided by five in divider 24 and by four in divider 25.

The output signals from the bandpass filters 40–42 are de-sampled in de-sampling means 31, 32, and 33 by the sample clock signal $f_s$ divided by five from divider 24. Next the output signals of channels 1 and 5 are inverted by inverters 26 and 27, respectively. Low pass filters 80, 81, and 82 remove all spectral images except the one at baseband in preparation for the next frequency division.

The output of channels 2 and 4 from bandpass filters 43 and 44 are de-sampled by the $f_s/4$ signal from divider 25 by de-sampling means 34 and 35 and then again sampled at the original sampling frequency by (interpolating) sampling means 36 and 37. Next the output signals from sampling means 36 and 37 are passed through low-pass filters 210 and 211 to produce the baseband spectrums. The output signals from filters 210 and 211 are then de-sampled at $f_s/5$ by sampling means 38 and 39, the de-sampled output from channel 2 being inverted by inverter 50. Low-pass filters 83 and 84 remove all spectral images except the one at baseband.

Figure 6:
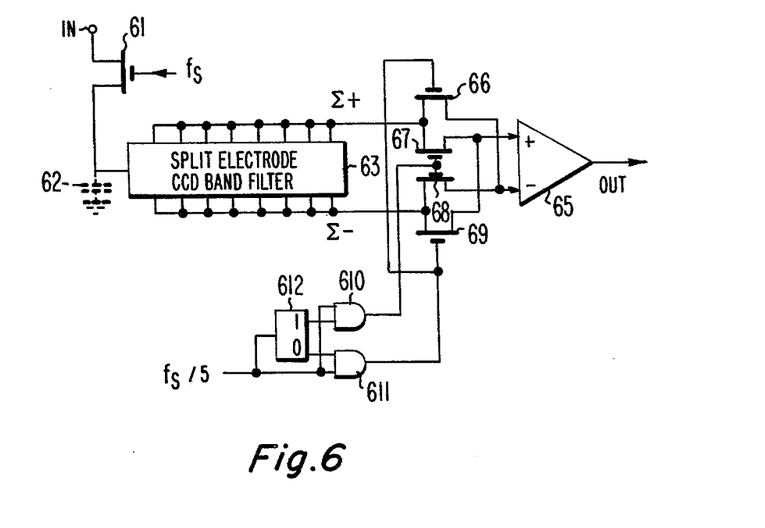
FIG. 6 is a combined logic and schematic diagram of a single circuit in the module of FIG. 3 for demultiplexing one channel.

FIG. 6 is schematic of a circuit which can be employed to implement the logic of channels 1–5 as shown in FIG. 3. The input sampling gate is shown as a field effect transistor (FET) 61 which is turned off and on by the output signal from the clock 23 in FIG. 3A. A holding capacitor 62 can be provided for the hold function. The bandpass filter is shown implemented as a state-of-the-art split electrode charge coupled device (CCD) bandpass filter 63. Such filters are well known in the art and need not be described in detail.

The output signal from the filter is taken as the sum of the positive and negative electrodes of filter 63. These signals are coupled via an input switching network to a difference amplifier 65 which supplies an output signal. The input switching network comprises four FETs 66–69, two AND gates 610 and 611, and a triggerable, single input flip-flop 612. The input to flip-flop 612 and the priming signal to AND gates 610 and 611 is the $f/5$ timing signal from divider 24 of FIG. 3A. Each negative-going edge of the $f_s/5$ signal causes the state of flip-flop 612 to change. This enables AND gates 610 and 611 alternatively to pass the timing signal $f_s/5$ to the steering transistors 67–69. When AND gate 610 is enabled by the set condition of flip-flop 612 and the occurrence of an $f_s/5$ pulse, the transistors 67 and 68 are turned on, passing the sum of the plus signals to the non-inverting input terminal of difference amplifier 65 and the sum of the negative electrodes from filter 63 to the inverting input of difference amplifier 65, respectively. Transistors 66 and 69 are disabled by the low output signal from AND gate 611 while flip-flop 612 is set. At the end of the $f_s/5$ pulse, both AND gates 610 and 611 are disabled by the logical zero value of the timing pulse and the negative-going edge thereof triggers flip-flop 612 to the reset state. When the $f_s/5$ signal again occurs, AND gate 611 is activated which turns on transistors 66 and 69 and turns off transistors 67 and 68. Transistor 66 couples the sum of the positive electrodes from filter 63 to the inverting input terminal of difference amplifier 65 while transistor 69 couples the sum of the negative electrodes to the non-inverting input of difference amplifier 65. The foregoing, in effect, causes the output signal from filter 63 to be multiplied by −1 on every alternate sample of the output signal. In this embodiment, inverter 26 (FIG. 3) and sampling gate for the output of the bandpass filter 40 (FIG. 3) are combined into one network comprising the transistors 67–69 and the logic elements.

For channel 3, the inversion function is not required so that difference amplifier 65 can be coupled directly to the output of the split electrodes of filter 63 and the output signal from difference amplifier 65 de-sampled with a single gate such as one of the transistors 67–69 whose gate is driven by the $f/5$ timing signal.

Figure 7:
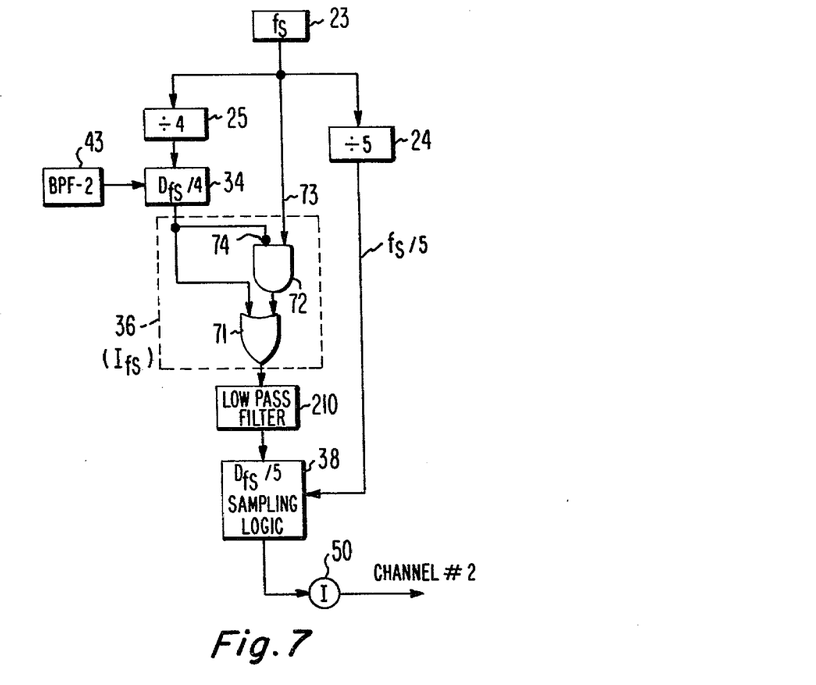
FIG. 7 is a combined logic and block diagram of logic for interpolating the de-sampled signals of even-numbered channels.

Referring now to FIG. 7 there is shown logic for altering by interpolation the sampling rate of signal being processed in the even-numbered channels 2 and 4 of FIG. 2 to a sampled rate of $f_s$ after the signals in channels 2 and 4 have been de-sampled by $f_s/4$ by de-sampling logic 34 and 35 of FIG. 3. Consider the logic of channel 2, which consideration will also be applicable to the logic of channel 4.

In FIG. 7 the logic within dotted block 36 corresponds to the interpolation logic 36 of FIG. 3. A sampling signal $f_s$ is supplied from source 23 to divide-by-4 logic 25, to input 73 of AND gate 72, and also to the divide-by-5 logic 24. The output of the bandpass filter 43, also shown in FIG. 3, is supplied to the de-sampling logic 34, which outputs a sampled signal every fourth $f_s$ clock pulse, by virtue of the clock pulses outputted from divide-by-4 logic 25.

The output of de-sampling logic 34 is then supplied to the inhibit input 74 of AND gate 72 and also directly to one input of OR gate 71. AND gate 72 will pass all of the clock pulses from the $f_s$ source 23, except when a sampled pulse is supplied from the de-sampling logic 34 which will inhibit hate 72. Thus, the output of AND gate 72 consists of groups of four clock pulses with every fifth pulse being inhibited by an output signal sample from de-sampling logic 34. Such fifth pulse is replaced, however, by the actual sampled output from sampling logic 34 which is supplied to OR gate 71 along with the groups of four clock pulses from the $f_s$ signal source 23. Thus, the output of OR gate 71 is a continuous stream of pulses at the $f_s$ rate which is supplied through low-pass filter 210 to de-sampling logic 38. The de-sampling logic 38 de-samples the signal, as discussed re FIGS. 2 and 3, and then supplies such de-sampled signal to inverter 50 to produce the output spectral component shown in FIG. 2J. It is to be understood that the spectral component 114, although shown as a negative component in FIG. 2J, is inverted by inverter 50 to become a positive component, as discussed hereinbefore.

Figure 8:
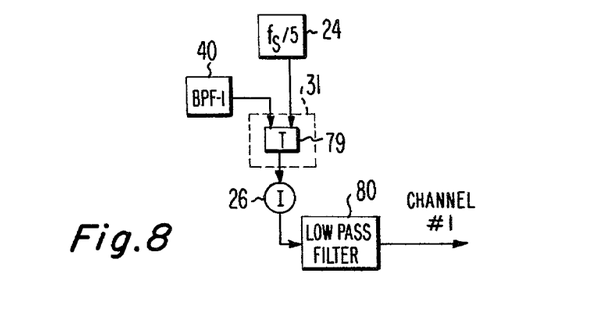
FIG. 8 shows logic for de-sampling a signal.

Referring now to FIG. 8 there is shown suitable logic for de-sampling a signal by $f_s/5$. In FIG. 8 the clock pulse $f_s/5$ is supplied from source 24, corresponding to the divide-by-5 logic 24 of FIG. 3, to one input of TRANSMISSION gate 79 which is the de-sampling logic 31 of FIG. 3. The other input of gate 79 receives the output from bandpass filter 40, also shown in FIG. 3. Thus, TRANSMISSION gate 79 is enabled only during every fifth pulse of the basic sampling frequency $f_s$ and thereby functions to pass only every fifth sampling pulse outputted from bandpass filter 40. Inverter 26 and low pass filter 80 function as described hereinbefore re FIG. 3.

Throughout the specification it has been assumed that the number of incoming channels of information equaled the channel capacity of the system, e.g. 125 channels. It is possible to employ the described system with its capacity of 125 channels to receive an incoming signal containing, for example, only 64 channels of information and to divide such incoming signal repeatedly to isolate the received 64 channels of information. The foregoing is accomplished by processing an assigned bandwidth which bears a ratio of 125:64 to the bandwidth to the received signal, but which includes the received bandwidth. The assigned bandwidth is then processed in the same manner discussed above, i.e. as if it contained 125 channels of information. However, only the 64 channels of information which actually contain the received information are utilized. The remaining 61 channels contain no useful information and are discarded. Thus, it is not necessary to employ the entire 31 modules shown in FIG. 1 if only 64 channels of information are being received. The first module which receives the incoming signal is required. However, in the second tier of modules only three thereof would be required, each of which would output 5 channels for a total of 15 channels. Each of these 15 channels would then be processed by 15 additional modules to output 75 channels which would be sufficient to process the 64 channels of information received.

Thus, 2 modules from the second tier of modules are not required and 10 modules from the third tier of modules are not needed, a total reduction of 12 modules.

This system can be designed to divide each spectral component by a factor other than 5, i.e., k can be equal to some integer other than 5. For example, k could be equal to 7. However, the total bandwidth of a spectral component including the guard bands must be such that the integral sub-multiples of the sampling frequency fall within the 7 channels to be divided such that de-sampling and interplation to translate component in each channel to baseband is feasible. For example, when k=5 it can be seen from FIG. 2 that the integral sub-multiples of $f_s$, which fall at points 80, 81, 82, and 83, bear an orderly relationship to the 5 channels 1–5. Only channels 2 and 4 require interpolation. However, since the sub-multiples 81 and 82 of $f_s$ fall in the center of channels 2 and 4, interpolation is relatively easy. It is because such relatively simple and orderly relationship is required between each of the channels and the sub-multiple of the sampling frequency that all of the 125 channels cannot be separated by one single tier of 25 modules. With only a single tier of modules the interpolation involved in translating the frequency spectrum of many of these channels to baseband would be quite difficult.

What is claimed is:

1. A system for frequency division multiplexing a received broad band signal into $k^m$ signal channels each capable of containing a baseband spectral component and comprising:

means for supplying first sampling and de-sampling signals having predetermined frequency ratios with respect to the bandwidth of said received broad band signal;

m descending tiers of identical channel division modules each comprising first logic means with the first tier thereof comprising a first of said modules whose logic means is responsive to the received broad band signal and to said first sampling and de-sampling signals to divide such broad band signal into k new signal channels each containing a baseband spectral component;

means for supplying separate sampling and de-sampling signals to the modules of each successive tier of modules positioned in descending manner below said first tier with each of said separate sampling and desampling signals having frequencies bearing said predetermined ratios to the bandwidth of the spectral component to be sampled and desampled thereby;

each module of each successive tier of modules comprising second logic means responsive to the spectral component contained in individual ones of the signal channels created by from the immediately preceding higher order tier of modules and to the sampling and de-sampling signals individual thereto to form k new additional channels each containing a baseband spectral component; and each baseband spectral component having an upper bandwidth limit which bears the same ratio to its sampling rate as the upper bandwidth limit of the originally received broad band signal bears to its sampling rate.

2. A system as in claim 1 in which the logic means of each module further comprises:

first de-sampling logic means responsive to desampling signals supplied thereto for de-sampling the discrete input signals in odd-numbered channels of said k channels by k:1 to produce a frequency spectrum from the signal contained in each odd-numbered channel with each frequency spectrum having positive and negative spectral components;

second de-sampling logic means responsive to desampling signals supplied thereto for de-sampling said discrete input signals in said even-numbered channels by k-1:1 to produce a frequency spectrum from the signal contained in each even-numbered channel with each frequency spectrum having positive and negative spectral components;

sampling logic means responsive to sampling signals supplied thereto for interpolating the de-sampled signals from said even-numbered channels by increasing the sampling rate by k-1:1 to produce interpolated signals;

third de-sampling logic means responsive to desampling signals supplied thereto for de-sampling the said interpolated signals by k-1; and means for reversing the polarity of frequency spectrums having negative spectral components occupying the positive side of the desampled frequency spectrum.

3. In a system for frequency division demultiplexing broad band input signals into k baseband signals, where k is an integer, and comprising first means for sampling the input signal to produce discrete input signals and filtering means for dividing said discrete input signals into k channels, a translating means for translating the frequency of each of said k channels to baseband and comprising:

first de-sampling means for de-sampling the discrete input signals in odd-numbered channels of said k channels by k:1 to produce a frequency spectrum from the signal contained in each odd-numbered channel with each frequency spectrum having positive and negative spectral components;

second de-sampling means for de-sampling said discrete input signals in said even-numbered channels by k-1:1 to produce a frequency spectrum from the signal contained in each even-numbered channel with each frequency spectrum having positive and negative spectral components;

sampling means for interpolating the de-sampled signals from said even-numbered channels by increasing the sampling rate by k-1:1;

third de-sampling means for de-sampling the said interpolated signals by k:1; and means for reversing the polarity of frequency spectrums having negative spectral components occupying the positive side of the de-sampled frequency spectrum.

4. In a system for frequency division demultiplexing a broad band input signal into $k^2$ baseband channels, where k is an integer, and comprising first sampling means for sampling the input signal to produce first discrete signals, first filtering means for dividing said first discrete signals into k channels, first translating means for translating the frequency of each of said k channels to baseband, second sampling means for sampling the translated signals in each of said k channels to produce second discrete signals, second filtering means for dividing said second discrete signals into $k^2$ channels, and second translating means for translating the frequency of each said $k^2$ channels to baseband, and in which said first and second translating means each comprises:

first de-sampling means for de-sampling the discrete input signals in odd-numbered channels of said k channels by k:1 to produce a frequency spectrum from the signal contained in each odd-numbered channel with each frequency spectrum having positive and negative spectral components;

second de-sampling means for de-sampling said discrete input signals in said even-numbered channels by k-1:1 to produce a frequency spectrum from the signal contained in each even-numbered channel with each frequency spectrum having positive and negative spectral components;

sampling means for interpolating the de-sampled signals from said even-numbered channels by increasing the sampling rate by k-1:1 to produce interpolated signals;

third de-sampling means for de-sampling the said interpolated signals by k-1; and means for reversing the polarity of frequency spectrums having negative spectral components occupying the positive side of the de-sampled frequency spectrum.

5. A method for frequency division demultiplexing broad-band input signals into baseband channels, where k is an integer, comprising the steps of:

sampling the input signal to produce discrete input signals;

bandpass filtering said discrete input signals into k channels;

translating said channels in frequency to baseband comprising:

de-sampling the signals in odd-numbered channels by k:1 to produce a frequency spectrum in each channel with each frequency spectrum having positive and negative spectral components;

de-sampling the signals in even-numbered channels from said even-numbered channels by k-1:1 to interpolate the frequency spectrum of said signals in even-numbered channels to baseband;

interpolating the de-sampled signals in even-numbered channels by k-1:1;

de-sampling the interpolated signals by k:1; and reversing the frequency spectrum of channels having negative spectral components occupying the positive side of the de-sampled spectrum.

6. A method for frequency division demultiplexing received broad band input signals into k baseband channels, where k is an integer, comprising the steps of:

demodulating said received signal to baseband;

sampling the input signal to produce discrete input signals;

bandpass filtering said discrete input signals into k channels;

de-sampling the signals in odd-numbered channels, by k:1 to produce a frequency spectrum for each odd-numbered channel with each frequency spectrum having positive and negative spectral components;

de-sampling the signals in even-numbered channels from said even-numbered channels by k-1:1 to produce a frequency spectrum for each even-numbered channel with each frequency spectrum having positive and negative spectral components;

interpolating the de-sampled signals in even-numbered channels by k-1:1;

de-sampling the interpolated signals by k:1; and reversing the spectrum of channels having negative spectral components occupying the positive side of the de-sampled spectrum.

* * * * *

UNITED STATES PATENT AND TRADEMARK OFFICE
CERTIFICATE OF CORRECTION

PATENT NO. : 4,316,282

DATED : February 16, 1982

INVENTOR(S) : Nicola Agostino Macina

It is certified that error appears in the above-identified patent and that said Letters Patent is hereby corrected as shown below:

Column 4, line 50, Exp. 4, "$C_n$ -" should be ---$C_n$ = ---;

Column 4, line 55, Exp. 5, "%" should be ---T---;

Column 5, line 21, "(Exp. a)" should be ---(Exp. 9)---.

Signed and Sealed this

Tenth Day of August 1982

[SEAL]

Attest:

GERALD J. MOSSINGHOFF

*Attesting Officer*     *Commissioner of Patents and Trademarks*